United States Patent
Bushman (10) Patent No.: US 8,966,207 B1
(45) Date of Patent: Feb. 24, 2015

(54) VIRTUAL DEFRAGMENTATION OF A STORAGE

(71) Applicant: Storagecraft Technology Corporation, Draper, UT (US)

(72) Inventor: Nathan S. Bushman, Pleasant Grove, UT (US)

(73) Assignee: Storagecraft Technology Corporation, Draper, UT (US)

(*) Notice: Subject to any disclaimer, the term of this patent is extended or adjusted under 35 U.S.C. 154(b) by 0 days.

(21) Appl. No.: 14/460,926

(22) Filed: Aug. 15, 2014

(51) Int. Cl.
*G06F 12/02* (2006.01)
*G06F 3/06* (2006.01)

(52) U.S. Cl.
CPC .............. *G06F 3/0647* (2013.01); *G06F 3/061* (2013.01); *G06F 3/0617* (2013.01); *G06F 3/0667* (2013.01); *G06F 3/067* (2013.01); *G06F 2003/0695* (2013.01)
USPC .......................................... 711/165; 711/202

(58) Field of Classification Search
CPC ............... G06F 12/0246; G06F 3/064; G06F 2206/1004; G06F 2212/7202; G06F 3/061; G06F 3/0643; G06F 3/0665; G06F 3/0674; G06F 3/0689; G06F 3/0676; G06F 3/0679; G06F 3/0641; G06F 3/0659; G06F 12/02; G06F 3/0608; G06F 2212/7205; G06F 3/0644
USPC .................................................. 711/165, 202
See application file for complete search history.

(56) References Cited

U.S. PATENT DOCUMENTS

| | | | | |
|---|---|---|---|---|
| 5,963,982 A * | 10/1999 | Goldman | ...................... | 711/170 |
| 7,664,771 B2 * | 2/2010 | Kusters et al. | ................. | 707/639 |
| 8,751,454 B1 * | 6/2014 | Bushman et al. | ............. | 707/640 |
| 2011/0113213 A1 * | 5/2011 | Obr et al. | ........................ | 711/165 |
| 2011/0197022 A1 * | 8/2011 | Green et al. | ................... | 711/112 |

* cited by examiner

*Primary Examiner* — Hashem Farrokh
(74) *Attorney, Agent, or Firm* — Maschoff Brennan (57) ABSTRACT

Virtual defragmentation of a storage. In one example embodiment, a method for virtual defragmentation of a storage includes various steps. For example, the method includes intercepting a move command directed to a storage during a defragmentation of the storage. The move command specifies an actual location of a block and a defrag location for the block in the storage. The method also includes updating a virtual defragmentation map to record the actual location of the block and the defrag location for the block. The method further includes preventing the block from being moved to the defrag location. The method also includes allowing file system metadata of the storage to be updated to falsely reflect that the block has been moved to the defrag location.

25 Claims, 5 Drawing Sheets

Fig. 4

# VIRTUAL DEFRAGMENTATION OF A STORAGE

FIELD

The embodiments disclosed herein relate to virtual defragmentation of a storage.

BACKGROUND

A storage is a computer-readable media, or some logical portion thereof, having an associated file system with file system metadata and being capable of storing data in blocks. Storages face a myriad of threats to the data they store and to their smooth and continuous operation. In order to mitigate these threats, a backup of the data in a storage may be created at a particular point in time to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and unallocated blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by writing the files to a backup storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the backup storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not necessarily need to be aware of the file system metadata or the files stored in the source storage, beyond utilizing minimal knowledge of the file system metadata in order to only back up allocated blocks since unallocated blocks are not generally backed up.

An image backup can be relatively fast compared to file backup because reliance on the file system is minimized. An image backup can also be relatively fast compared to a file backup because seeking is reduced. In particular, during an image backup, blocks are generally read sequentially with relatively limited seeking. In contrast, during a file backup, blocks that make up individual files may be scattered, resulting in relatively extensive seeking.

One common problem encountered with image backup is the fragmentation of files when it comes time to restore a backup to a restore storage. For example, since image backup does not necessarily need to be aware of the file system metadata or the files stored in the source storage, where files in the source storage are fragmented at the time of backup, those files will remain fragmented at the time of restore in the restore storage. This fragmentation can have a negative impact on the read and write performance of the restore storage.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to virtual defragmentation of a storage. The example methods disclosed herein may be employed to virtually defragment a storage by defragmenting block references in file system metadata of the storage without actually moving the corresponding blocks themselves within the storage. Subsequently, when the storage is copied, a virtual defragmentation map may be employed such that the copy is actually defragmented instead of only virtually defragmented. The virtual defragmentation of a storage as disclosed herein may be significantly faster and less resource intensive than an actual defragmentation of the storage, and may result in actual defragmentation in any copy that is subsequently made of the storage.

In one example embodiment, a method for virtual defragmentation of a storage includes various steps. For example, the method includes intercepting a move command directed to a storage during a defragmentation of the storage. The move command specifies an actual location of a block and a defrag location for the block in the storage. The method also includes updating a virtual defragmentation map to record the actual location of the block and the defrag location for the block. The method further includes preventing the block from being moved to the defrag location. The method also includes allowing file system metadata of the storage to be updated to falsely reflect that the block has been moved to the defrag location.

In another example embodiment, a method for virtual defragmentation of a storage includes various steps. For example, the method includes intercepting every move command directed to a storage during a defragmentation of the storage. Each move command specifies an actual location of a block and a defrag location for the block in the storage. Then, for each intercepted move command, the method also includes updating a virtual defragmentation map to record the actual location of the block and the defrag location for the block, preventing the block from being moved to the defrag location, allowing file system metadata of the storage to be updated to falsely reflect that the block has been moved to the defrag location, and returning a report that the move command was successfully executed on the storage.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

The term "storage" as used herein refers to computer-readable media, or some logical portion thereof, having an associated file system with file system metadata and being capable of storing data in blocks. For example, a storage may be, but is not limited to, a volume; an image backup of a volume such as a base image backup, an incremental image backup, or a decremental image backup; an image backup stored as a standalone file; an image backup stored in a deduplication vault; a physical disk storage; or a virtual disk storage. The term "block" as used herein refers to a fixed-length discrete sequence of bits. The term "backup" when used herein as a noun refers to a copy or copies of one or more blocks from a storage. The phrase "modify a command" or similar phrases used herein refer to the command itself being altered or the command being replaced with a new command. Upon completion of the command, the altered command may be altered back so that any data returned due to the command does not reveal any alteration to the caller, or the replaced command may have been queued so that any data returned due to the command does not reveal any replacement to the caller.

Figure 1:
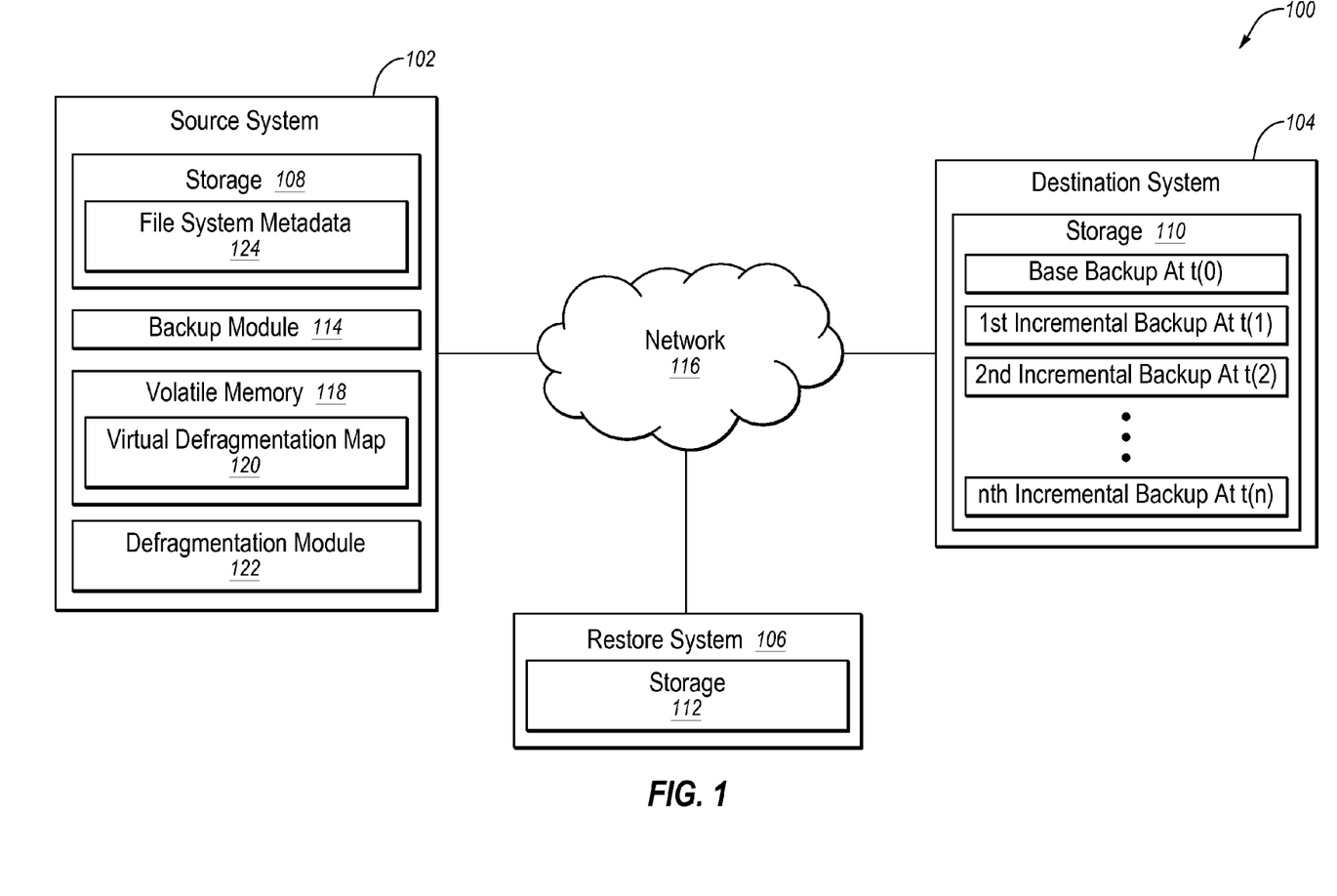
FIG. 1 is a schematic block diagram illustrating an example image backup and restore system.

FIG. 1 is a schematic block diagram illustrating an example image backup and restore system 100. As disclosed in FIG. 1, the example system 100 includes a source system 102, a destination system 104, and a restore system 106. The systems 102, 104, and 106 include storages 108, 110, and 112, respectively. The destination storage 110 stores a base backup and multiple incremental backups that represent the state of the source storage 108 at various snapshot times. For example, the base backup represents time t(0), the 1st incremental backup represents time t(1), the 2nd incremental backup represents time t(2), and the nth incremental backup represents time t(n). The source system 102 also includes a backup module 114. The systems 102, 104, and 106 are able to communicate with one another over a network 116. The source system 102 also includes a volatile memory 118 in which a virtual defragmentation map 120 is stored, as well as a defragmentation module 122. The source storage 108 stores blocks of data, which may be divided into one or more volumes, for example.

Each of the systems 102, 104, and 106 may be any computing device capable of supporting a storage and communicating with other systems including, for example, file servers, web servers, personal computers, desktop computers, laptop computers, handheld devices, multiprocessor systems, microprocessor-based or programmable consumer electronics, smartphones, digital cameras, hard disk drives, flash memory drives, and virtual machines. The network 116 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof.

The image backup files stored in the destination storage 110 may be created by the backup module 114. For example, the backup module 114 may be configured to execute computer instructions to perform image backup operations of creating a base backup and multiple incremental backups of the source storage 108. It is noted that these image backups may initially be created on the source system 102 and then copied to the destination system 104.

For example, the base backup may be created to capture the state at time t(0). This image backup operation may include the backup module 114 copying all allocated blocks of the source storage 108 as allocated at time t(0) and storing the allocated blocks in the destination storage 110. The state of the source storage 108 at time t(0) may be captured using snapshot technology in order to capture the data stored in the source storage 108 at time t(0) without interrupting other processes, thus avoiding downtime of the source storage 108. The base backup may be very large depending on the size of the source storage 108 and the number of allocated blocks at time t(0). As a result, the base backup may take a relatively long time to create and consume a relatively large amount of space in the destination storage 110.

Next, the 1st and 2nd incremental backups may be created to capture the states at times t(1) and t(2), respectively. This may include copying only changed allocated blocks of the source storage 108 present at time t(1) and storing the changed allocated blocks in the destination storage 110, then later copying only changed allocated blocks of the source storage 108 present at time t(2) and storing the changed allocated blocks in the destination storage 110. The states of the source storage 108 at times t(1) and t(2) may again be captured using snapshot technology, thus avoiding downtime of the source storage 108. Each incremental backup may include only those allocated blocks from the source storage 108 that were changed after the time of the previous backup. Thus, the 1st incremental backup may include only those allocated blocks from the source storage 108 that changed between time t(0) and time t(1), and the 2nd incremental backup may include only those allocated blocks from the source storage 108 that changed between time t(1) and time t(2). In general, as compared to the base backup, each incremental backup may take a relatively short time to create and consume a relatively small storage space in the destination storage 110.

Finally, an nth incremental backup may be created to capture the state at time t(n). This may include copying only changed allocated blocks of the source storage 108 present at time t(n), using snapshot technology, and storing the changed allocated blocks in the destination storage 110. The nth incremental backup may include only those allocated blocks from the source storage 108 that changed between time t(n) and time t(n−1).

Therefore, incremental backups may be created on an ongoing basis. The frequency of creating new incremental backups may be altered as desired in order to adjust the amount of data that will be lost should the source storage 108 experience corruption of its stored data or become unavailable at any given point in time. The data from the source storage 108 can be restored to the state at the point in time of a particular backup by applying the image backup file(s) to the restore storage 112 from oldest to newest, namely, first applying the base backup and then applying any successive incremental backup(s).

Although only allocated blocks are included in the example incremental backups discussed above, it is understood that in alternative implementations both allocated and unallocated blocks may be backed up during the creation of a base backup or an incremental backup. This is typically done for forensic purposes, because the contents of unallocated blocks can be interesting where the unallocated blocks contain data from a previous point in time when the blocks were in use and allocated. Therefore, the creation of base backups and incremental backups as disclosed herein is not limited to allocated blocks but may also include unallocated blocks.

Further, although only base backups and incremental backup files are discussed above, it is understood that the source storage 108 may instead be backed up by creating a base backup and one or more decremental image backup files. Decremental backups are created by initially creating a base backup to capture the state at a previous point in time, then updating the base backup to capture the state at a subsequent point in time by modifying only those blocks in the base backup that changed between the previous and subsequent points in time. Prior to the updating of the base backup, however, the original blocks in the base backup that correspond to the changed blocks are copied to a decremental backup, thus enabling restoration of the source storage 108 at the previous point in time (by restoring the updated base backup and then restoring the decremental backup) or at the subsequent point in time (by simply restoring the updated base backup). Since restoring a single base backup is generally faster than restoring a base backup and one or more incremental or decremental backups, creating decremental backups instead of incremental backups may enable the most recent backup to be restored more quickly since the most recent backup is always a base backup or an updated base backup instead of potentially being an incremental backup. Therefore, the methods disclosed herein are not limited to defragmentation involving base and incremental backups, but may also include defragmentation involving base and decremental backups.

During performance of the example methods disclosed herein, the virtual defragmentation map 120 may be employed in the performance of a virtual defragmentation of the source storage 108. Later, the backup module 114 may perform an image backup operation resulting in the base backup and the incremental backups that are actually defragmented. Alternatively, a similar defragmentation map (not shown) may be employed on the destination system 104 to virtually defragment the base backup or the incremental backups. Later, the backup module 114 may perform a restore operation resulting in an actually defragmented restoration of the data from the source storage 108 on the restore storage 112. As discussed in greater detail below, this virtual defragmentation of the source storage 108 or of the base or incremental backups may be significantly faster and less resource intensive that an actual defragmentation, and results in actual defragmentation in any copy that is subsequently made of the source storage or of the base or incremental backups.

In one example embodiment, the source system 102 may be a desktop computer, the destination system 104 may be a file server, the restore system 106 may be a laptop computer, and the network 116 may include the internet. In this example embodiment, the desktop computer may be configured to perform a virtual defragmentation of the source storage 108 and the file server may be configured to periodically back up, into the destination storage 110, as one or more image backup files actually defragmented versions of the storage 108 of the desktop computer over the internet as part of a backup job. The file server may also be configured to restore one or more of the image backup files to the restore storage 112 of the laptop computer over the internet if the desktop computer experiences corruption.

Although only a single storage is disclosed in each of the systems 102, 104, and 106 in FIG. 1, it is understood that any of the systems 102, 104, and 106 may instead include two or more storages. Further, although the systems 102, 104, and 106 are disclosed in FIG. 1 as communicating over the network 116, it is understood that the systems 102, 104, and 106 may instead communicate directly with each other. For example, in some embodiments the systems 102, 104, and 106 may be combined into a single system. Also, although the storages 108, 110, and 112 are disclosed as separate storages, it is understood that the storages 108, 110, and 112 may be combined into a single storage. For example, in some embodiments a first volume of the source storage 108 may function as a source storage during the creation of a backup that is stored in a second volume of the source storage 108. Subsequently, the backup stored in the second volume may be restored to the first volume, which may enable the first volume of the source storage 108 to be restored to a state of an earlier point in time. In another example, the source system 102 may have a separate storage (not shown) to which a backup of the source storage 108 is restored. In both of these examples, the source system 102 functions as a source system, a destination system, and a restore system. Further, although the modules 114 and 122 are the only modules disclosed in the example system 100 of FIG. 1, it is understood that the functionality of the modules 114 and 122 may be replaced or augmented by one or more similar modules residing on any of the systems 102, 104, and 106 or another system.

Having described one specific environment with respect to FIG. 1, it is understood that the specific environment of FIG. 1 is only one of countless environments in which the example methods disclosed herein may be practiced. The scope of the example embodiments is not intended to be limited to any particular environment.

Figure 2:
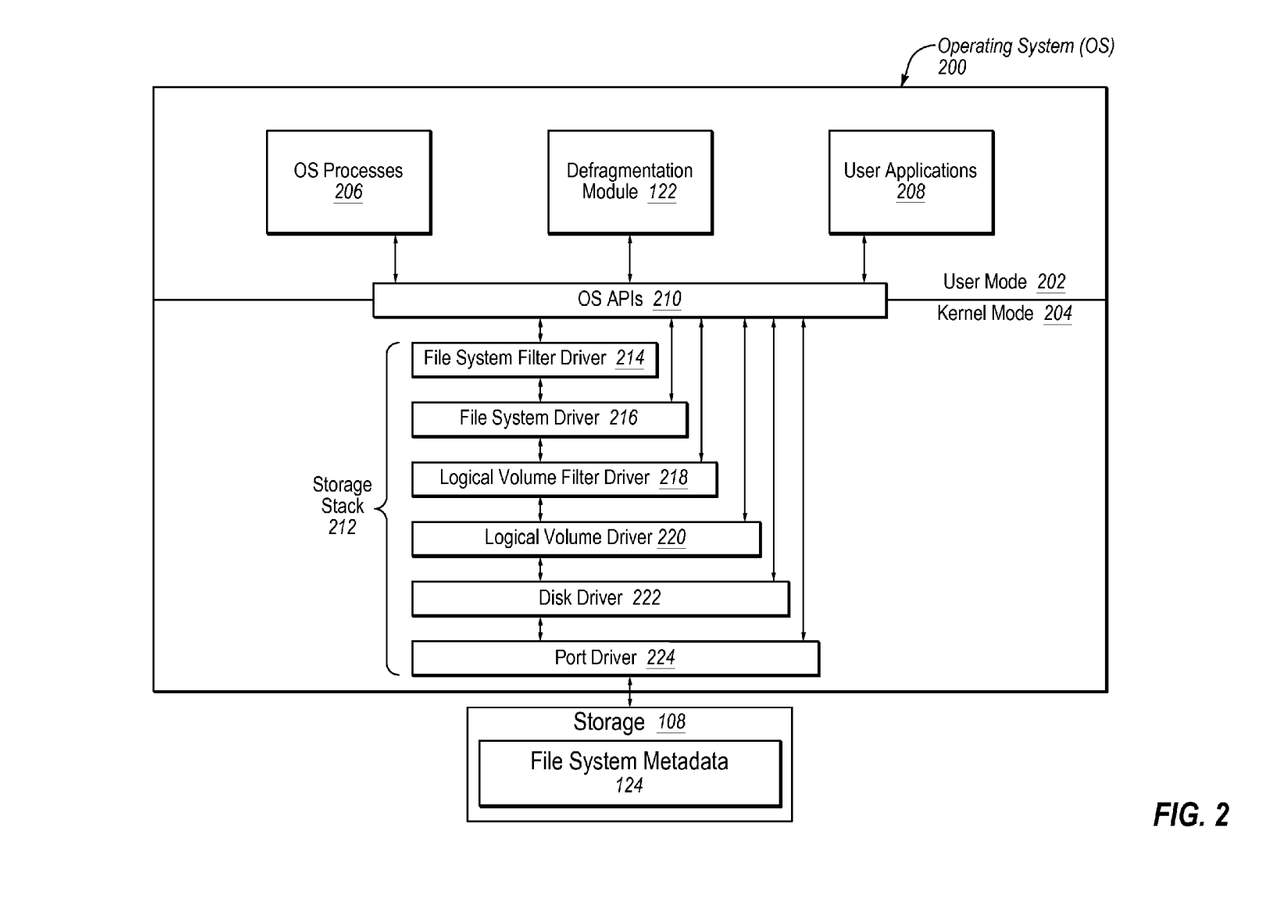
FIG. 2 is a simplified block diagram of an operating system of a source system of FIG. 1.

FIG. 2 is a simplified block diagram of an operating system (OS) 200 of the source system 102 of FIG. 1. As disclosed in FIG. 2, the OS 200 is generally divided between a user mode 202 and a kernel mode 204. The user mode 202 includes OS processes 206 and user applications 208 configured for operation with the OS 200. The OS 200 may also include OS Application Program Interfaces (APIs) 210 for providing functionality to, and a general interface between, modules in the user mode 202 and the kernel mode 204.

The kernel mode 204 includes lower level operating system modules which handle file I/O requests, which generally form a storage stack 212. The storage stack 212 includes a file system filter driver 214, a file system driver 216, a logical volume filter driver 218, a logical volume driver 220, a disk driver 222, and a port driver 224, as well as device drivers (not shown) for the various hardware devices in the source system 102. Modules within the OS 200, including components in the user mode 202 and the kernel mode 204, or any other component that is capable of interacting with the OS APIs 210, can make use of the OS APIs 210 to initiate file Input/Output (I/O) requests which may take the form of read commands, write commands, and move commands to the file system driver 216.

The file system driver 216 passes file I/O requests on to the logical volume driver 220 to determine what disk(s), and what sector(s) on the disk(s), should be accessed to perform the file I/O requests. The logical volume driver 220 then passes these file I/O requests with disk-specific information, such as disk sector location(s), to the disk driver 222. Disk requests, which may be local or remote, are made to the port driver 224 that converts the disk request into the necessary hardware controls to retrieve or store the desired data on the source storage 108. Of course, as stated earlier, the source storage 108 may include multiple logical volumes on different partitions of the disk.

The source storage 108 may be any of a variety of devices, such as magnetic disks, optical disks, solid state disks, Universal Serial Bus (USB) drives, and the like.

The user mode 202 may also include the defragmentation module 122. The defragmentation module 122 may be configured to perform defragmentation of the source storage 108. For example, the defragmentation module 122 may be configured to reduce the amount of fragmentation of the files stored in the source storage 108 by contiguously locating all blocks on the source storage 108 to the front end or back end of the source storage 108 and/or by contiguously and sequentially locating every block of one or more files on the source storage 108. However, since actual defragmentation can be relatively slow and resource intensive, the example methods of virtual defragmentation disclosed herein employ the file system filter driver 214 and the logical volume filter driver 218, as well as the virtual defragmentation map 120 to only virtually defragment the source storage 108, by defragmenting block references in file system metadata 124 of the source storage 108 without actually moving the corresponding blocks themselves within the source storage 108, while deceiving the defragmentation module 122 to believe that the source storage 108 has actually been defragmented. This virtual defragmentation of the source storage 108 may be significantly faster and less resource intensive that an actual defragmentation of the source storage 108, and results in actual defragmentation in any copy that is subsequently made of the source storage.

The file system filter driver 214 functions by intercepting file I/O requests to enable the file system filter driver 214 to modify each file I/O request prior to passing the file I/O request down to the file system driver 216 or up to the OS APIs 210. Similarly, the logical volume filter driver 218 functions by intercepting requests to enable the logical volume filter driver 218 to modify each request prior to passing the request down to the logical volume driver 220 or up to the file system driver 216. The file system filter driver 214 and the logical volume filter driver 218 may further communicate with each other outside of passing requests or modified requests.

During performance of the example methods disclosed herein, the defragmentation module 122 may attempt to perform an actual defragmentation of the source storage 108 by sending various move commands directed to the source storage 108. However, in order to avoid the time and resources that would be consumed during an actual defragmentation of the source storage 108, the file system filter driver 214 and the logical volume filter driver 218 may modify the move commands in order to only virtually defragment the source storage, which may be significantly faster and less resource intensive that an actual defragmentation of the source storage 108.

For each such move command, these modifications may be accomplished by the file system filter driver 214 and the logical volume filter driver 218 using the following steps. First, the file system filter driver 214 may intercept the move command. The move command will include an actual location of the block and a defrag location for the block. Next, the file system filter driver 214 may inform the logical volume filter driver 218 that an imminent read and write request will be issued by the file system driver 216 in association with the intercepted move command. Then, the file system filter driver 214 may forward the intercepted move command to the file system driver 216. Next, the file system driver 216 may issue a read command for the actual location of the block to the logical volume driver 220. Then, the logical volume filter driver 218 may intercept the read request. Next, the logical volume filter driver 218 may falsely respond to the file system driver 216 that the block at the actual location was read, without actually reading any block from the source storage 108. It is noted that where the file system driver 216 integrates with a caching facility of the OS 200, the results of the read request may be marked as non-cacheable. Then, the file system driver 216 may issue a write command for the defrag location of the block to the logical volume driver 220. Next, the logical volume filter driver 218 may intercept the read request. Then, the logical volume filter driver 218 may update the virtual defragmentation map 120 to map the actual location to the defrag location. Next, the logical volume filter driver 218 may falsely respond to the file system driver 216 that the block from the actual location has now been written to the defrag location, without actually writing any block to the source storage 108. Then, the file system driver 216 may update the file system metadata 124 to falsely reflect that the block has been moved to the defrag location. Next, the file system driver 216 may respond that the move command was successful. It is noted that the updating of the virtual defragmentation map 120 may be alternatively performed by the file system driver 216 upon interception of this response. Finally, the defragmentation module 122 will be falsely notified that the move command was successful. In this manner, the file system filter driver 214 and the logical volume filter driver 218 is able to modify a move command during an attempted actual defragmentation of the source storage 108 to instead accomplish a virtual defragmentation of the source storage 108.

It is noted that in some example embodiments the file system filter driver 214 and the logical volume filter driver 218 may be the same actual filter driver that is operating at the two levels disclosed in FIG. 2. Also, as an alternative to a separate file system filter driver 214, the file system driver 216 may be modified to include the functionality of the file system filter driver 214. Further, as an alternative to a separate logical volume filter driver 218, the logical volume driver 220 may be modified to include the functionality of the logical volume filter driver 218.

Figure 3A:
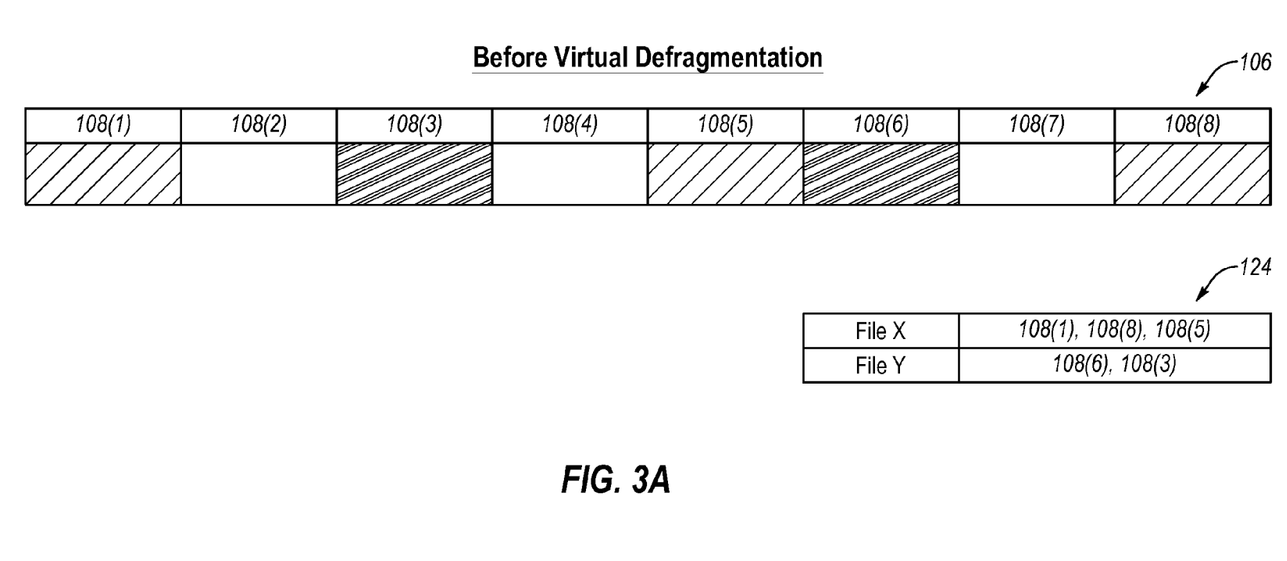
FIGS. 3A and 3B are schematic block diagrams illustrating aspects of a virtual defragmentation of a storage.
Figure 3B:
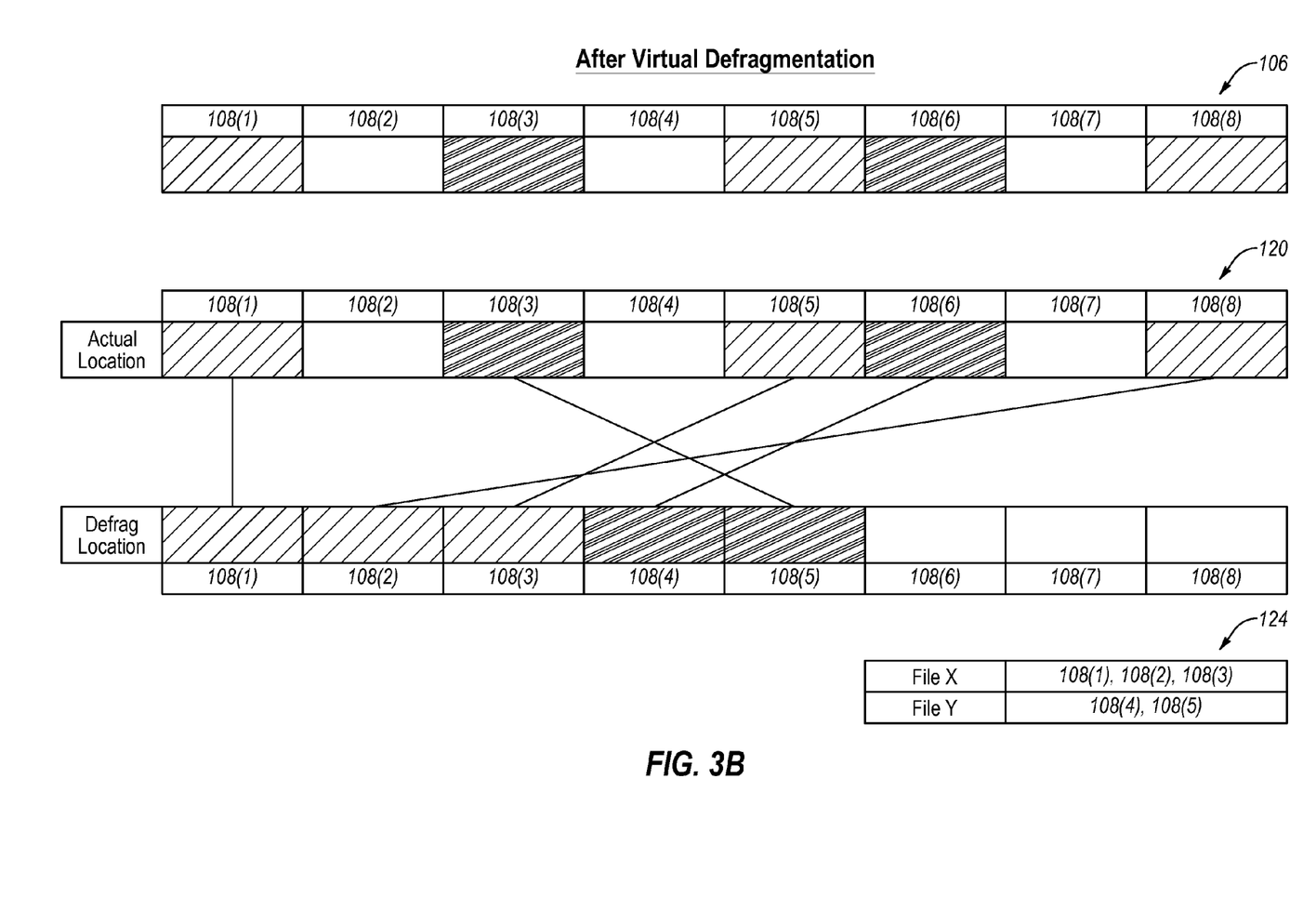

FIGS. 3A and 3B are schematic block diagrams illustrating a virtual defragmentation of the source storage 108 of FIGS. 1 and 2. As disclosed in FIGS. 3A and 3B, the source storage 108 is partitioned into a physical layout of blocks at locations 108(1)-108(8). In some example embodiments, the size of each block is 4096 bytes, although any other block size could instead be employed. The size of each block may be configured to match the standard sector or cluster size of a file system of the source storage 108. In some example embodiments, the source storage 108 may each have millions or even billions of blocks, or more. The blank blocks in FIGS. 3A and 3B represent unallocated blocks. Multiple blocks illustrated with matching hatch patterns in FIGS. 3A and 3B represent blocks that belong to a single file. FIGS. 3A and 3B will now be discussed with reference to FIG. 2.

FIG. 3A discloses a state of the source storage 108 before virtual defragmentation has been performed. In the state disclosed in FIG. 3A, the file system metadata 124 of the source storage 108 truthfully indicates that the source storage 108 includes two fragmented files, namely, File X and File Y. File X is made up of three blocks at 108(1), 108(8), and 108(5). File Y is made up of two blocks at 108(6) and 108(3). Files X and Y are each fragmented in FIG. 3A because their respective blocks are neither contiguously located at the front end or back end of the source storage 108 nor contiguously and sequentially located together.

FIG. 3A discloses a state of the source storage 108 after virtual defragmentation has been performed. In the state disclosed in FIG. 3B, the file system metadata 124 of the source storage 108 continues to truthfully indicate that the source storage 108 includes two files, namely, File X and File Y, but now also falsely indicates that these two files have been actually defragmented. In particular, the virtual defragmentation of the source storage 108 has resulted in the block references in the file system metadata 124 of the source storage 108 being defragmented without the corresponding blocks themselves being within the source storage 108. For example, the file system metadata 124 falsely indicates that the three blocks of File X are now stored at 108(1), 108(2), and 108(3) and that the two blocks of File Y are now stored at 108(4) and 108(5), but in reality none of these blocks have been moved from their original locations in the source storage 108. Instead, a mapping between the actual location of each block and the false location noted in the defragmented file system metadata 124 (referred to herein as the "defrag location") has been stored in the virtual defragmentation map 120. In this manner, given the defrag location of any given block, the virtual defragmentation map 120 can be employed to determine the actual location.

It is noted that in at least some example embodiments, one a particular block has been virtually defragmented, all subsequent read commands or write commands to the defrag location of the block may be re-routed to the actual location of the block and all subsequent read commands or write commands to the actual location of the block may be re-routed to the defrag location of the block.

Figure 4:
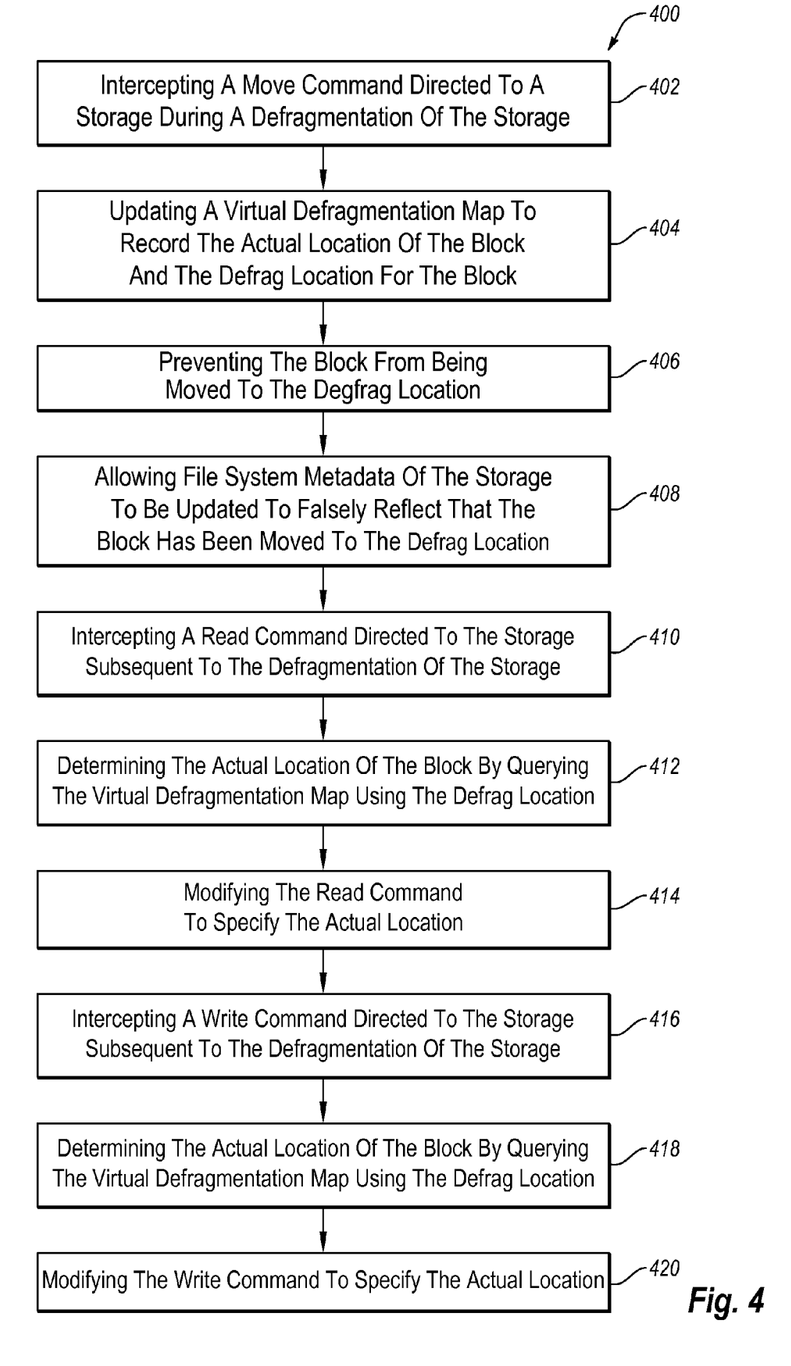
FIG. 4 is a schematic flowchart diagram of an example method for virtual defragmentation of a storage.

FIG. 4 is a schematic flowchart diagram of an example method 400 for virtual defragmentation of a storage. The method 400 may be implemented, in at least some embodiments, by the file system filter driver 214 and the logical volume filter driver 218 of the source system 102 of FIG. 1. For example, the file system filter driver 214 and the logical volume filter driver 218 may be configured to execute computer instructions to perform operations of virtually defragmenting the source storage 108 prior to the creation of a backup of the source storage 108, as represented by one or more of steps of the method 400. Although illustrated as discrete steps, various steps may be divided into additional steps, combined into fewer steps, or eliminated, depending on the desired implementation. The method 400 will now be discussed with reference to FIGS. 1, 2, 3A, 3B, and 4.

The method 400 may include step 402 in which a move command directed to a storage is intercepted during a defragmentation of the storage. For example, during a defragmentation of the source storage 108 by the defragmentation module 122, the defragmentation module 122 may send various move commands in an attempt to defragment the files stored in the source storage 108. As each move command is sent through the OS APIs 210 to the file system driver 216, the file system filter driver 214 may, at step 402, intercept the move command.

Each move command may specify an actual location of a block and a defrag location for the block in the storage. For example, during the defragmentation of the source storage 108 as illustrated in FIGS. 3A and 3B, a move command may specify that the block stored at the actual location 108(8) should be moved to the defrag location 108(2), in order to place this second block of File X contiguously and sequentially next to the first block of File X, which is located at the actual and defrag location 108(1).

The method 400 may include step 404 in which a virtual defragmentation map is updated to record the actual location of the block and the defrag location for the block. Continuing with the above example, the file system filter driver 214 or the logical volume filter driver 218 may, at step 404, update the virtual defragmentation map 120, as disclosed in a comparison of FIG. 3A to FIG. 3B, to record that the actual location of the second block of File X is 108(8) and that the defrag location for the second block of the File X is 108(2).

The method 400 may include a step 406 in which the block is prevented from being moved to the defrag location. Continuing with the above example, the logical volume filter driver 218 may, at step 406, prevent the second block of File X from being moved from the actual location at 108(8) to the defrag location at 108(2) by not passing on a read command for the actual location and a write command for the defrag location to the logical volume driver 220, thus avoiding the actual moving of the second block. Preventing the moving of the second block of File X during the virtual defragmentation of the source storage 108 allows the virtual defragmentation to proceed more quickly and use less resources than an actual defragmentation of the source storage 108.

The method 400 may include a step 408 in which the file system metadata of the storage is allowed to be updated to falsely reflect that the block has been moved to the defrag location. Continuing with the above example, the file system filter driver 214 may, at step 408, allow the file system metadata 124 of the source storage 108 to be updated to falsely reflect that the second block of File X has been moved to the defrag location 108(2), as disclosed in FIG. 3B, even though the second block of File X has not been moved and remains stored at the actual location 108(8).

The method 400 may include a step 410 in which a read command directed to the storage subsequent to the defragmentation of the storage is intercepted. Continuing with the above example, the logical volume filter driver 218 may, at step 410, intercept a read command directed to the second block of File X. The read command may specify the defrag location of the block. Continuing with the above example, the intercepted read command directed to the second block of File X may specify the defrag location as 108(2).

The method 400 may include a step 412 in which the actual location of the block is determined by querying the virtual defragmentation map using the defrag location. Continuing with the above example, the logical volume filter driver 218 may, at step 412, query the virtual defragmentation map 120 using the defrag location 108(2) of the second block of File X to determine that the defrag location 108(2) maps to the actual location 108(8).

The method 400 may include a step 414 in which the read command is modified to specify the actual location. Continuing with the above example, the file system filter driver 214 may, at step 414, modify the read command to specify the actual location 108(8) in place of the defrag location 108(2). In this manner, even though the block references in the file system metadata 124 may not match the corresponding blocks stored in the source storage 108 after the virtual defragmentation, read commands can still be successfully executed on the source storage using the virtual defragmentation map 120.

The method 400 may include a step 416 in which a write command directed to the storage subsequent to the defragmentation of the storage is intercepted. Continuing with the above example, the logical volume filter driver 218 may, at step 416, intercept a write command directed to the second block of File X. The write command may specifying the defrag location for the block as well as new content for the block. Continuing with the above example, the intercepted write command directed to the second block of File X may specify the defrag location 108(2) as well as new content for the block.

The method 400 may include a step 418 in which the actual location of the block is determined by querying the virtual defragmentation map using the defrag location. Continuing with the above example, the logical volume filter driver 218 may, at step 418, query the virtual defragmentation map 120 using the defrag location 108(2) of the second block of File X to determine that the defrag location 108(2) maps to the actual location 108(8).

The method 400 may include a step 420 in which the write command is modified to specify the actual location. Continuing with the above example, the logical volume filter driver 218 may, at step 420, modify the write command to specify the actual location 108(8) in place of the defrag location 108(2). In this manner, even though the block references in the file system metadata 124 may not match the corresponding blocks stored in the source storage 108 after the virtual defragmentation, write commands can still be successfully executed on the source storage using the virtual defragmentation map 120.

The method 400 can therefore be employed to avoid the time and resources that would be consumed during an actual defragmentation of a source storage, and instead virtually defragment a storage by defragmenting block references in file system metadata of the storage without actually moving the corresponding blocks themselves within the storage. This virtual defragmentation may be significantly faster and less resource intensive that an actual defragmentation of the storage. The method 400 may further enable read commands and write commands to be executed as normal despite the file system metadata not match the corresponding blocks stored in the storage after the virtual defragmentation.

Although the example methods of virtual defragmentation disclosed herein are implemented using filter drivers, it is understood that these example methods may alternatively be implemented by one or more other modules. For example, where the storage being virtually defragmented is an image backup file, one or more modules may interact directly with the data in the image backup file to modify the file system metadata of the backup image file. Therefore, the example methods of virtual defragmentation disclosed herein may be implemented without using filter logic. It is further noted that where the storage that is virtually defragmented is an incremental image backup, it may be advantageous to associate the corresponding virtual defragmentation map with the incremental image back in such a way that the virtual defragmentation map may be referenced whenever the incremental backup image is ever accessed.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general-purpose computer, special-purpose computer, or virtual computer such as a virtual machine. Combinations of the above may also be included within the scope of computer-readable media.

Computer-executable instructions comprise, for example, instructions and data which cause a general-purpose computer, special-purpose computer, or virtual computer such as a virtual machine to perform a certain function or group of functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" or "filter" may refer to software objects or routines that execute on a computing system. The different modules or filters described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method for virtual defragmentation of a storage, the method comprising:
    intercepting a move command directed to a storage during a defragmentation of the storage, the move command specifying an actual location of a block and a defrag location for the block in the storage;
    updating a virtual defragmentation map to record the actual location of the block and the defrag location for the block;
    preventing the block from being moved to the defrag location;
    allowing file system metadata of the storage to be updated to falsely reflect that the block has been moved to the defrag location;
    intercepting a read command directed to the storage subsequent to the defragmentation of the storage, the read command specifying the defrag location of the block;
    determining the actual location of the block by querying the virtual defragmentation map using the defrag location; and
    modifying the read command to specify the actual location.

2. The method as recited in claim 1, wherein the defragmentation of the storage is configured to contiguously locate all blocks on the storage to a front end or back end of the storage.

3. The method as recited in claim 1, wherein the defragmentation of the storage is configured to contiguously and sequentially locate every block of one or more files on the storage.

4. The method as recited in claim 1, wherein the storage comprises a volume of a physical disk storage or a volume of a virtual disk storage.

5. The method as recited in claim 1, wherein the storage comprises an image backup of a volume.

6. One or more non-transitory computer-readable media storing one or more programs that are configured, when executed, to cause one or more processors to execute the method as recited in claim 1.

7. A method for virtual defragmentation of a storage, the method comprising:
intercepting a move command directed to a storage during a defragmentation of the storage, the move command specifying an actual location of a block and a defrag location for the block in the storage;
updating a virtual defragmentation map to record the actual location of the block and the defrag location for the block;
preventing the block from being moved to the defrag location;
allowing file system metadata of the storage to be updated to falsely reflect that the block has been moved to the defrag location;
intercepting a write command directed to the storage subsequent to the defragmentation of the storage, the write command specifying the defrag location for the block as well as new content for the block;
determining the actual location of the block by querying the virtual defragmentation map using the defrag location; and
modifying the write command to specify the actual location.

8. The method as recited in claim 7, wherein the storage comprises a volume of a virtual disk storage.

9. The method as recited in claim 7, wherein the storage comprises an image backup of a volume.

10. One or more non-transitory computer-readable media storing one or more programs that are configured, when executed, to cause one or more processors to execute the method as recited in claim 7.

11. A method for virtual defragmentation of a storage, the method comprising:
intercepting a move command directed to a storage during a defragmentation of the storage, the defragmentation of the storage being configured to contiguously locate all blocks on the storage to a front end or back end of the storage and contiguously and sequentially locate every block of one or more files on the storage, the move command specifying an actual location of a block and a defrag location for the block in the storage;
updating a virtual defragmentation map to record the actual location of the block and the defrag location for the block;
preventing the block from being moved to the defrag location; and
allowing file system metadata of the storage to be updated to falsely reflect that the block has been moved to the defrag location.

12. The method as recited in claim 11, wherein the storage comprises a volume of a virtual disk storage.

13. The method as recited in claim 11, wherein the storage comprises an image backup of a volume.

14. One or more non-transitory computer-readable media storing one or more programs that are configured, when executed, to cause one or more processors to execute the method as recited in claim 11.

15. A method for virtual defragmentation of a storage, the method comprising:
intercepting a move command directed to a storage during a defragmentation of the storage, the storage comprising an image backup stored in a deduplication vault storage, the move command specifying an actual location of a block and a defrag location for the block in the storage;
updating a virtual defragmentation map to record the actual location of the block and the defrag location for the block;
preventing the block from being moved to the defrag location; and
allowing file system metadata of the storage to be updated to falsely reflect that the block has been moved to the defrag location.

16. One or more non-transitory computer-readable media storing one or more programs that are configured, when executed, to cause one or more processors to execute the method as recited in claim 15.

17. A method for virtual defragmentation of a storage, the method comprising:
intercepting every move command directed to a storage during a defragmentation of the storage, the defragmentation of the storage being configured to contiguously locate all blocks on the storage to a front end or back end of the storage and contiguously and sequentially locate every block of one or more files on the storage, each move command specifying an actual location of a block and a defrag location for the block in the storage; and
for each intercepted move command:
updating a virtual defragmentation map to record the actual location of the block and the defrag location for the block;
preventing the block from being moved to the defrag location;
allowing file system metadata of the storage to be updated to falsely reflect that the block has been moved to the defrag location; and
returning a report that the move command was successfully executed on the storage.

18. The method as recited in claim 17, further comprising:
intercepting every read command directed to the storage subsequent to the defragmentation of the storage, each read command specifying the defrag location for the block; and
for each intercepted read command:
determining the actual location of the block by querying the virtual defragmentation map using the defrag location; and
modifying the read command to specify the actual location.

19. The method as recited in claim 18, wherein:
the intercepting every read command directed to the storage subsequent to the defragmentation of the storage includes intercepting every read command directed to the storage during an image copy of the storage; and
the read blocks are returned in a defragmented order as reflected in the file system metadata of the storage rather than in an actual order of the blocks as actually stored on the storage.

20. The method as recited in claim 19, wherein the image copy is performed during a restore of an image backup file of the storage.

21. The method as recited in claim 20, wherein the image backup file is a full image backup file.

22. The method as recited in claim 20, wherein the image backup file is an incremental image backup file.

23. The method as recited in claim 17, wherein the storage comprises an image backup of a volume.

24. The method as recited in claim 17, further comprising:
intercepting every write command directed to the storage subsequent to the defragmentation of the storage, each write command specifying the defrag location for the block as well as new content for the block;
for each intercepted write command:
determining the actual location of the block by querying the virtual defragmentation map using the defrag location; and
modifying the write command to specify the actual location.

25. One or more non-transitory computer-readable media storing one or more programs that are configured, when executed, to cause one or more processors to execute the method as recited in claim 17.

* * * * *